Aug. 4, 1942. C. H. TAYLOR 2,291,929
WALL OR LIKE PLUGS
Filed April 3, 1940
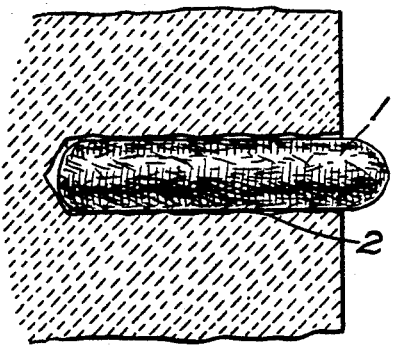
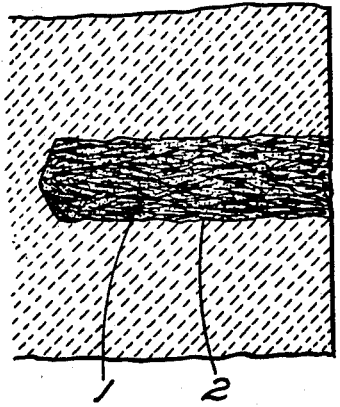
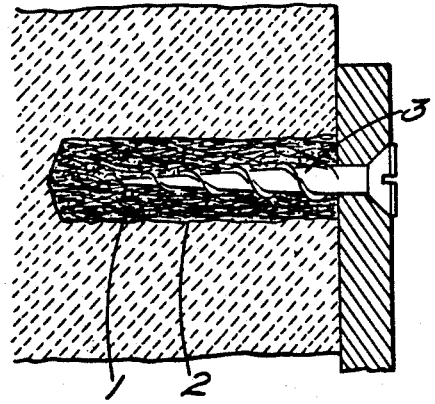
Inventor
Charles Harold Taylor
By Peck & Peck
Attys Patented Aug. 4, 1942

2,291,929

UNITED STATES PATENT OFFICE 2,291,929

WALL OR LIKE PLUG

Charles Harold Taylor, New Barnet, England

Application April 3, 1940, Serial No. 327,722
In Great Britain April 13, 1939

4 Claims. (Cl. 72—105)

This invention relates to wall or like plugs such as are employed for insertion into a prepared hole in a wall or the like in order to provide a hold for a screw, nail or other securing means.

Various types of rigid preformed plugs have previously been proposed but these usually require the formation of a hole in the wall or the like of a size which may not vary beyond certain very narrow limits, this operation taking some appreciable time and calling for considerable skill. In consequence a large number of sizes of plugs have been required in order to provide for the varying sizes of the screws which may be employed. This difficulty has recently been overcome by the provision of a plastic plug which is inserted into the hole in the wall while in a wet or moistened state and subsequently sets hard. Such plugs may be employed to fill holes which vary widely in size and can quickly be prepared by an unskilled person.

The object of the present invention is the provision of a semi-rigid but non-plastic preformed plug which shall be adaptable to various sizes of hole without difficulty but shall nevertheless provide a secure hold for the screw or the like while being convenient to handle.

According to the invention a semi-rigid wall or like plug comprises an intermixed mass of fibres held together in plug form by a small proportion of a binder that is distributed throughout the mass and has a comparatively low resistance to tensile stresses.

The fibres run in all directions in the mass and preferably constitute approximately 90% by weight of the finished plug. A suitable binder is cement, plaster of Paris or the like and filling materials may also be incorporated during the formation of the plug, for example, pumice powder, emery powder and other fine granular mineral substances.

The nature of the invention will be clearly understood from the following more detailed description, given by way of example only with reference to the accompanying drawing wherein:

Fig. 1 shows a plug according to the invention,

Fig. 2 shows a plug inserted in a hole in a wall,

Fig. 3 shows a plug in the wall after it has been compressed axially, and

Fig. 4 shows the securing of a member by a screw screwed into the plug.

A mass of asbestos or other fibres, asbestos being preferred, is intimately mixed with about 6% by weight of finely powdered cement and 4% by weight of a substance, such as flour, which is capable of acting as a temporary binder during the shaping of the mass to a plug and the subsequent setting of the cement. The fibrous mass with the pulverulent substances distributed therethrough is moistened with water and shaped to plug form as shown in Fig. 1, for example, by lightly rolling the coherent plastic mass thus obtained between two plates or the like to produce a cylindrical plug. Alternatively, the shaping of the plugs may be effected by the aid of a flat stationary plate above which travels the lower run of a slightly roughened endless rubber belt, the moistened mass being supplied between the plate and the belt at one end and delivered in plug form at the other end. The plate is preferably maintained at a given distance from the belt by spring means or by weights and means may be provided for adjusting the said distance in order to vary the diameter of the plugs produced. The plugs may be made in any convenient length, 1½ inches being very suitable, and may be rolled to any one of a plurality of selected diameters. The number of diameters required, however, is considerably smaller than with the known rigid preformed plugs. The plugs obtained are allowed to harden and set and are then ready for use.

In use, a plug 1 of an appropriate diameter, i. e. at least slightly smaller than the diameter of the hole 2 to be filled and hardened and set as above stated, is inserted into the hole (see Fig. 2) and is compressed axially therein by means of a ramming or tamping tool which may be the jumper or drill that was used for making the hole. This axial compression causes the cement between the fibres to be subjected to radial tensile stresses varying in magnitude with the size of the clearance between the plug and the wall of the hole. In consequence some of the cement bonds between the fibres break down and the plug is deformed to fill the hole completely as is indicated in Fig. 3, the outer layer of fibres conforming exactly to all the irregularities in the wall of the hole. Any particles of cement and/or filler becoming detached from the fibres during this operation are retained in close association therewith due to the intermixed and crossing character of the mass of fibres, and serve to fill completely all the interstices between the fibres. There is no splitting of the plug but rather an expansion thereof radially. A screw 3 or the like may then be driven into the plug without difficulty and obtains a very secure hold. It has been found that the screw may subsequently be withdrawn and replaced any number of times with perfect ease and without detriment to the secure hold afforded by the plug.

When a larger hole is to be plugged two or more of the small diameter wall plugs according to this invention may be introduced side-by-side and rammed or compressed axially as described. There is no appreciable reduction in the strength of the fixing thus obtained when compared with a similar fixing produced with the aid of a single plug of a diameter approximately equal to that of the hole.

The term "intermixed and crossing mass of fibres" is used herein to denote a mass of intermixed fibres which run in all directions through the mass and may be of approximately equal length or of widely varying lengths, the fibres usually being all of the same character.

It should be noted that I consider that the best results are obtained when the mixture from which the plug is formed contains about 10%, or less, of binder, by weight, but that the percentage of binder may be increased somewhat, if desired, with a gradual decrease in the desired properties of the plug, and that a weight percentage of 20% of binder is somewhat close to the upper limit of binder which can be used with sufficiently good results to be commercially effective.

What I claim is:

1. A non-pliable plug for walls and the like comprising a mass of intermixed fibres which run in all directions through the mass and are held together in plug form by a hardened binder in the proportion of not to exceed approximately 20 percent. by weight of the plug, said binder having a low tensile strength and being intimately mixed with said fibres and distributed throughout the mass.

2. A non-pliable plug for walls and the like comprising a mass of intermixed fibres which run in all directions through the mass and are held together in plug form by a hardened binder in the proportion of not to exceed approximately 10 percent. by weight of the plug, said binder having a low tensile strength and being intimately mixed with said fibres and distributed throughout the mass.

3. A non-pliable plug for walls and the like comprising a mass of intermixed fibres which run in all directions through the mass and are held together in plug form by a hardened and set cementitious binder in the proportion of not to exceed approximately 20 per cent. by weight of the plug, said binder having a low tensile strength and being intimately mixed with said fibres and distributed throughout the mass.

4. A method of securing screws, nails and like securing means in prepared holes in walls and the like which consists in intimately mixing a mass of fibres, arranged to inter-cross and run in all directions, with not to exceed approximately 20 per cent. by weight of a powdered binder material having, in its hardened form, slight resistance to tensile stresses, moistening the same and shaping to plug form in plastic condition, drying and hardening the plug to a condition of non-pliability, driving the plug thus obtained into a hole of somewhat larger diameter than itself with axial compression sufficient to cause it to fill the hole by outward expansion with the breaking down of the bonds between at least some of the fibres, and inserting the securing means into the plug thus positioned.

CHARLES HAROLD TAYLOR